(12) United States Patent
Kim

(10) Patent No.: US 8,964,057 B2
(45) Date of Patent: Feb. 24, 2015

(54) APPARATUS AND METHOD FOR SELECTIVE PIXEL BINNING

(75) Inventor: Seong Jin Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 567 days.

(21) Appl. No.: 13/267,322

(22) Filed: Oct. 6, 2011

(65) Prior Publication Data

US 2012/0281121 A1    Nov. 8, 2012

(30) Foreign Application Priority Data

May 2, 2011    (KR) .................. 10-2011-0041436

(51) Int. Cl.
*H04N 5/228* (2006.01)
*H04N 5/351* (2011.01)
*H04N 5/347* (2011.01)

(52) U.S. Cl.
CPC .............. *H04N 5/351* (2013.01); *H04N 5/347* (2013.01)
USPC ....................................................... 348/222.1

(58) Field of Classification Search
None
See application file for complete search history.

(56) References Cited

U.S. PATENT DOCUMENTS

| | | | |
|---|---|---|---|
| 7,492,391 B1* | 2/2009 | Kaplinsky | 348/218.1 |
| 2006/0187324 A1* | 8/2006 | Lin | 348/241 |
| 2006/0285007 A1* | 12/2006 | Yuyama et al. | 348/362 |
| 2007/0242081 A1* | 10/2007 | Jeong et al. | 345/606 |
| 2008/0084483 A1* | 4/2008 | Kusaka | 348/222.1 |
| 2009/0190007 A1* | 7/2009 | Oggier et al. | 348/241 |
| 2010/0066849 A1* | 3/2010 | Lim et al. | 348/222.1 |
| 2011/0267495 A1* | 11/2011 | Atkinson | 348/229.1 |
| 2011/0285910 A1* | 11/2011 | Bamji et al. | 348/631 |

FOREIGN PATENT DOCUMENTS

| | | |
|---|---|---|
| JP | 2005-528857 | 9/2005 |
| KR | 10-2005-0078737 | 8/2005 |
| KR | 10-2006-0124704 | 12/2006 |
| KR | 10-0714068 | 4/2007 |
| KR | 10-2010-0095465 | 8/2010 |

* cited by examiner

*Primary Examiner* — Albert Cutler
(74) *Attorney, Agent, or Firm* — Harness, Dickey & Pierce, P.L.C.

(57) ABSTRACT

An output level of a pixel is determined using a reflected light reflected against an object. Pixel binning is selectively performed according to the output level of the pixel.

15 Claims, 7 Drawing Sheets

APPARATUS AND METHOD FOR SELECTIVE PIXEL BINNING

CROSS-REFERENCE TO RELATED APPLICATIONS

This application claims the priority benefit of Korean Patent Application No. 10-2011-0041436, filed on May 2, 2011, in the Korean Intellectual Property Office, the disclosure of which is incorporated herein by reference.

BACKGROUND

1. Field

Example embodiments of the following description provide an apparatus and method for selectively binning a pixel to secure accuracy of a depth image.

2. Description of the Related Art

A sensor to acquire a depth image receives light reflected from an object. The depth image is acquired by measuring a quantity of electrons transferred to a float diffusion (FD) node included in a pixel that constitutes the sensor. The depth image may be determined using the measured quantity of electrons.

Here, when intensity of the reflected light is insufficient because a pixel size is too small or a distance between the object and the sensor is too great, the depth image becomes dark, accordingly decreasing accuracy of the depth image. Therefore, there is a need for a method to improve the accuracy of the depth image even when intensity of the reflected light is insufficient.

SUMMARY

The foregoing and/or other aspects are achieved by providing a pixel binning apparatus including an output level determining unit to determine an output level of a current pixel constituting a sensor; and a pixel binning unit to perform binning of the current pixel based on the output level of the current pixel.

The foregoing and/or other aspects are achieved by providing a pixel binning apparatus method including determining an output level of a current pixel constituting a sensor, and performing pixel binning corresponding to a current pixel based on the output level of the current pixel.

Additional aspects, features, and/or advantages of example embodiments will be set forth in part in the description which follows and, in part, will be apparent from the description, or may be learned by practice of the disclosure.

According to example embodiments, accuracy of a depth image may be increased by repeating binning of a pixel until an output level of the pixel reaches a predetermined threshold level.

According to other example embodiments, edge blurring may be prevented since a pixel determined as an edge through color information is excluded during the pixel binning.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
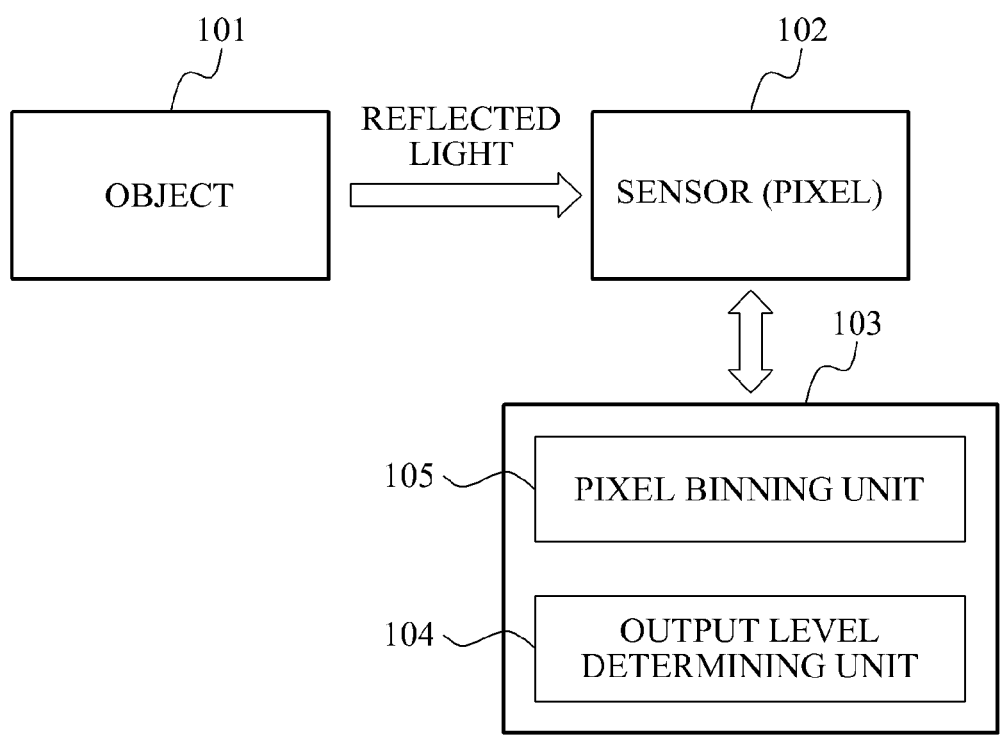
FIG. 1 illustrates an overall structure of a pixel binning apparatus according to example embodiments.

Reference will now be made in detail to example embodiments, examples of which are illustrated in the accompanying drawings, wherein like reference numerals refer to like elements throughout. Example embodiments are described below to explain the present disclosure by referring to the figures.

FIG. 1 illustrates an overall structure of a pixel binning apparatus 103 according to example embodiments.

Referring to FIG. 1, the pixel binning apparatus 103 may include an output level determining unit 104 and a pixel binning unit 105.

The output level determining unit 104 may determine an output level of a current pixel constituting a sensor 102. The current pixel refers to a pixel for extraction of a depth image, among a plurality of pixels constituting the sensor 102. Here, the output level of the current pixel may be determined by intensity of a light reflected from an object 101. The intensity of the reflected light may be determined by reflectance of the object 101 or a distance between the object 101 and the sensor 102. A process of determining the output level of the current pixel will be described in further detail with reference to FIG. 3.

Accuracy of the sensor 102 adapted to acquire the depth image may be determined by a quantity of electrons generated by an infrared ray reflected in the current pixel. Here, the accuracy of the sensor 102 may be calculated by Equation 1 as follows:

$$\Delta R \propto \frac{k}{\sqrt{N_{electron}}} \qquad \text{[Equation 1]}$$

where ΔR denotes accuracy of the sensor, k denotes a pixel size, and N denotes the quantity of electrons. An increase in the pixel size causes an increase in a manufacturing cost of the sensor 102. Therefore, accuracy of the sensor 102 needs to be guaranteed even when a pixel of a small size is used. Example embodiments therefore suggest pixel binning to increase the accuracy of the sensor 102. However, the pixel binning means an increase in the pixel size, which may reduce resolution of the depth image. Accordingly, the pixel binning apparatus 103 may selectively perform the pixel binning according to the output level of the pixels, thereby increasing accuracy of the sensor 102 and preventing reduction of the resolution of the depth image.

The pixel binning unit 105 may perform pixel binning according to the current pixel based on the output level of the current pixel. Here, the pixel binning of the current pixel is defined as adding up output levels of peripheral pixels adjoining the current pixel and the output level of the current pixel. That is, since the output level is higher when the pixel binning is performed than when the pixel binning is not performed, the accuracy of the sensor 102 may be enhanced by the pixel binning.

First, a start point in binning of the current pixel may be set randomly. Since the peripheral pixels adjoining the current pixel are apt to show similar depth images to the current pixel, the pixel binning unit 105 may bin the peripheral pixels into the current pixel. Also, the pixel binning unit 105 may select the peripheral pixels to be binned with the current pixel so that the pixel binning is performed in a square form such as, 2×2 and 3×3. However, the pixel binning unit 105 may select the peripheral pixels so that the pixel binning is performed in a rectangular form.

As the output level of the current pixel increases, the quantity of electrons generated in the current pixel subsequently increases. According to Equation 1, as the quantity of the electrons becomes greater, the accuracy of the sensor 102 consequently increases. That is, when the accuracy is high, the pixel binning is unnecessary. Conversely, as the output level of the current pixel is lower, the quantity of the electrons generated in the current pixel decreases. According to Equation 1, as the number of the electrons decreases, the accuracy of the sensor subsequently decreases. Therefore, when the accuracy is low, the current pixel to acquire the depth image may be binned with the peripheral pixels. Consequently, the number of pixels to be binned may be determined by the output level.

For example, the pixel binning unit 105 may repeat the pixel binning until a resultant output level of binning of the current pixel and the peripheral pixels exceeds a predetermined threshold level. That is, the pixel binning apparatus 103 may selectively perform the pixel binning based on the output level, and thereby prevent reduction of the image resolution.

In the aforementioned cases, the sensor 102 is capable of extracting only the depth image. When the sensor 102 is capable of extracting both a color image and a depth image, the pixel binning apparatus 103 may achieve more accurate pixel binning using the color image.

Additionally, the pixel binning unit 105 may perform the pixel binning in consideration of an edge of the object 101, the edge derived from color information. For example, the pixel binning unit 105 may bin, into the current pixel, remaining peripheral pixels other than peripheral pixels corresponding to the edge, among peripheral pixels adjoining the current pixel unrelated to the edge. On the other hand, the pixel binning unit 105 may bin, into the current pixel, peripheral pixels related to the edge other than peripheral pixels unrelated to the edge, among peripheral pixels adjoining the current pixel related to the edge.

The pixel binning apparatus 103 may prevent edge blurring by not performing binning between pixels related to the edge and pixels unrelated to the edge. That is, the pixel binning apparatus may effectively prevent reduction of the resolution of the depth image, by selectively performing the pixel binning based on the color information showing relatively high resolution in comparison to the depth image.

Figure 2:
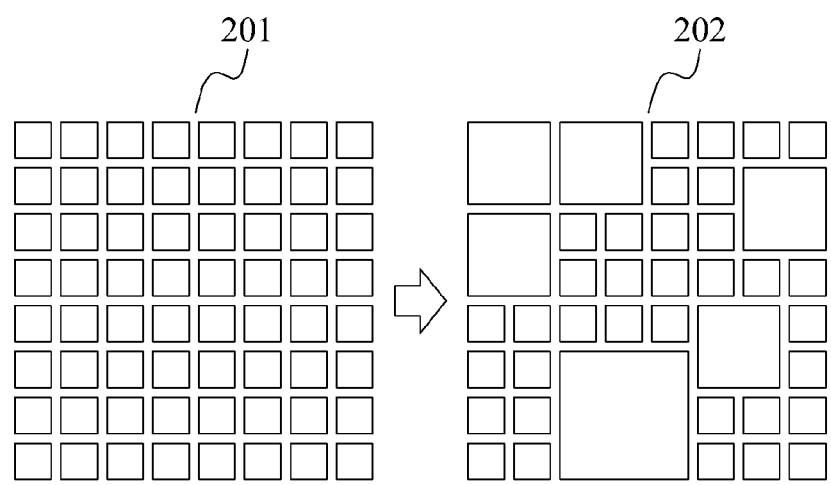
FIG. 2 illustrates a result of binning a pixel, according to other example embodiments.

FIG. 2 illustrates a result of binning a pixel, according to other example embodiments.

A sensor 201 shows a state where binning of a current pixel for extraction of a depth image is not performed. A sensor 202 shows a state where the current pixel is partially binned. Here, binned pixels in the sensor 202 may be considered as a single pixel from which the depth image is to be extracted.

Figure 3:
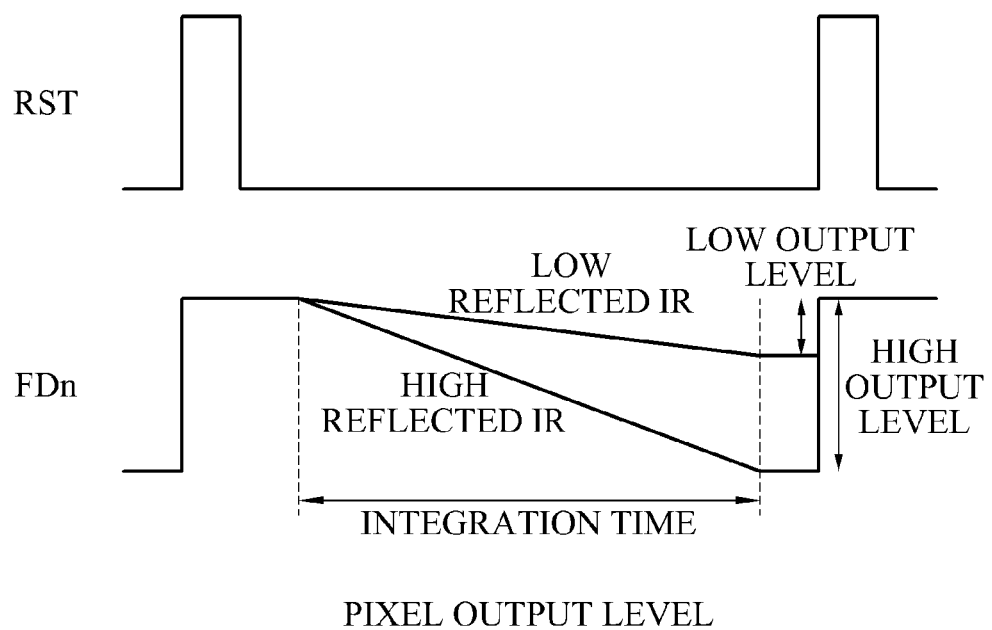
FIG. 3 illustrates an output level of a pixel, according to still other example embodiments.

FIG. 3 illustrates an output level of a pixel, according to still other example embodiments.

Referring to FIG. 3, the pixel binning apparatus 103 may determine an output level of a current pixel, using variation of voltage of a float diffusion (FD) node included in the pixel according to reflected light, for example, reflected infrared (IR) light from an object, in an integration time after light is projected to the object. Here, since peripheral pixels adjoining the current pixel generally have similar depths, output levels of the peripheral pixels are similar to an output level of the current pixel.

When the output level of the current pixel is lower than a predetermined threshold level, the pixel binning apparatus 103 may bin the current pixel and sum the output levels of the current pixel and the peripheral pixels. That is, the pixel binning may be repeatedly performed until the sum output level exceeds the threshold level.

Figure 4:
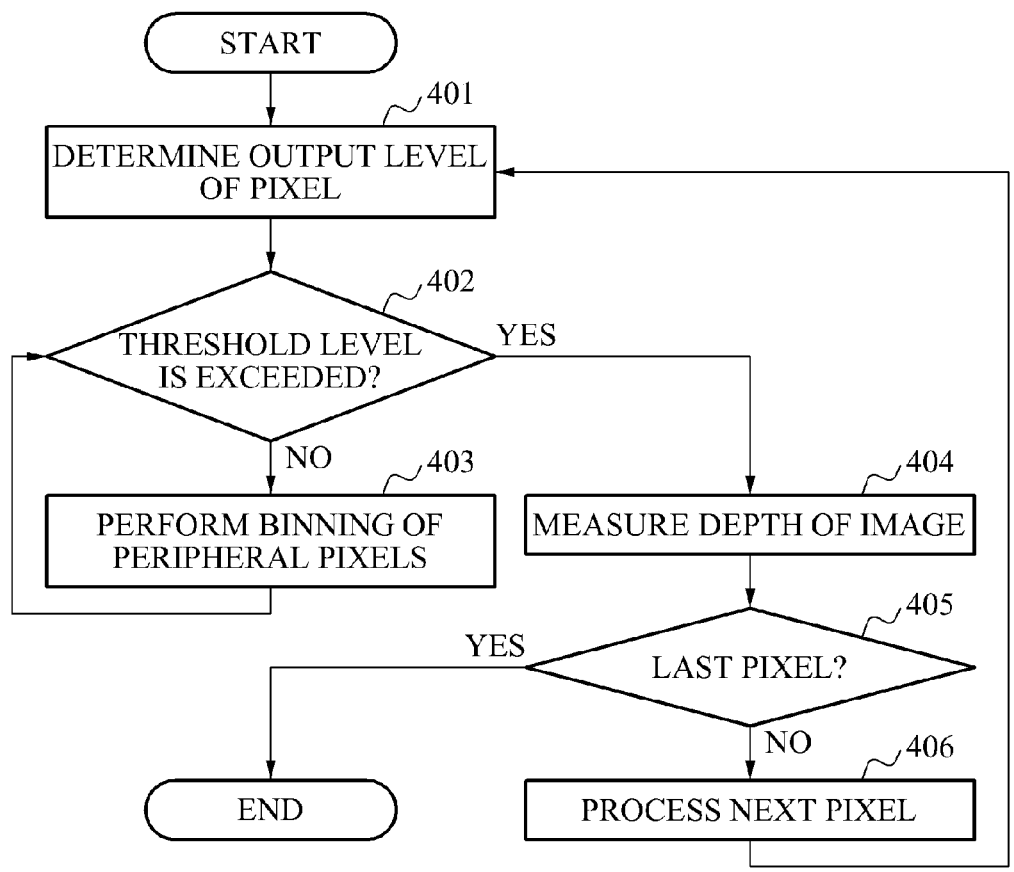
FIG. 4 illustrates a method of binning a pixel according to yet other example embodiments.

FIG. 4 illustrates a method of binning a pixel according to yet other example embodiments.

In operation 401, the pixel binning apparatus may determine an output of a pixel constituting a sensor. Here, the pixel binning apparatus may determine an output level of a current pixel for acquisition of a depth image.

In operation 402, the pixel binning apparatus may determine whether the output level of the current pixel exceeds a threshold level. When the output level of the current pixel does not exceed the threshold level, the pixel binning apparatus may bin peripheral pixels adjoining the current pixel into the current pixel in operation 403. Then, in operation 402, the pixel binning apparatus may determine whether a sum of the output level of the current pixel and output levels of the peripheral pixels exceeds the threshold level. Operations 402 and 403 may be repeated until the sum of the binned pixels exceeds the threshold level.

When the output level of the current pixel exceeds the threshold level, the pixel binning apparatus may measure depth of an image in operation 404. Next, in operation 404, the pixel binning apparatus may determine whether the current pixel is a last pixel. In operation 405, when the current pixel is the last pixel, the entire process is completed. When the current pixel is not the last pixel, a next pixel of the current pixel may be processed in operation 406. Here, the pixel binning apparatus may return to operation 401 to determine an output level of the next pixel.

Figure 5:
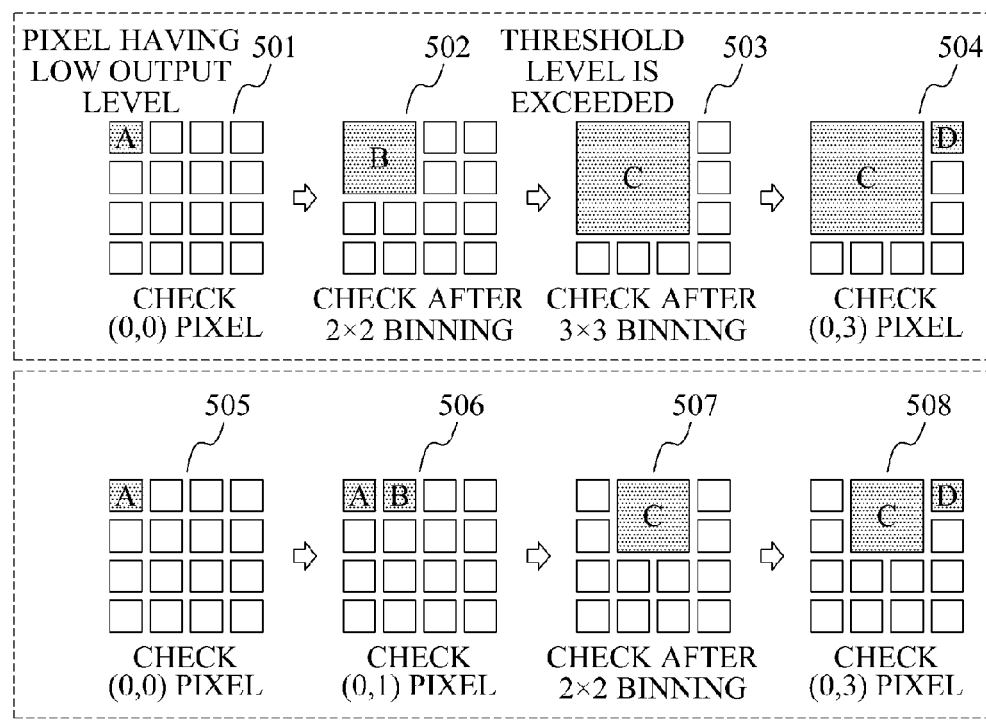
FIG. 5 illustrates a process of pixel binning according to the pixel binning method of FIG. 4.

FIG. 5 illustrates a process of pixel binning according to the pixel binning method of FIG. 4.

In operation 501, the pixel binning apparatus may determine an output level of a current pixel A for extraction of a depth image. The current pixel A is located at (0, 0) of the sensor. It is presumed that the output level of the current pixel A does not exceed the threshold level.

In operation 502, the pixel binning apparatus may derive a current pixel B by binning peripheral pixels of the current pixel A into the current pixel A. As an example, the current pixel B may be in a square form of 2×2. However, in other embodiments, the current pixel B may be in a rectangular form. Depending on whether the output level of the current pixel B exceeds the threshold level, whether additional pixel binning will be performed may be determined.

In operation 503, when the output level of the current pixel B does not exceed the threshold value, the pixel binning apparatus may bin peripheral pixels of the current pixel B into the current pixel B, thereby deriving a current pixel C in a square form of 3×3. Here, it is presumed that an output level of the current pixel C exceeds the threshold level. Therefore, in operation 504, the pixel binning apparatus may extract the depth image corresponding to a pixel D located next to the current pixel C.

According to another example, in operation 505, the pixel binning apparatus may determine the output level of the current pixel A located at (0, 0). Here, when the output level of the current pixel A exceeds the threshold level, a depth image of the current pixel B located at (0, 1) is extracted without performing the pixel binning.

In operation 506, the pixel binning apparatus may determine the output level of the current pixel B. Here, it is presumed that the output level of the current pixel B does not exceed the threshold level.

In operation 507, the pixel binning apparatus may derive the current pixel C of the 2×2 form by binning the peripheral pixels of the current pixel B. Next, the pixel binning apparatus may determine whether the output level of the current pixel C exceeds the threshold level. Here, it is presumed that the output level of the current pixel C exceeds the threshold level.

In operation 508, the pixel binning apparatus may determine an output level of a current pixel D which is a next pixel of the current pixel C. In addition, the pixel binning apparatus may determine whether to perform pixel binning corresponding to the current pixel C, by comparing the output level of the current pixel D with the threshold level.

Figure 6:
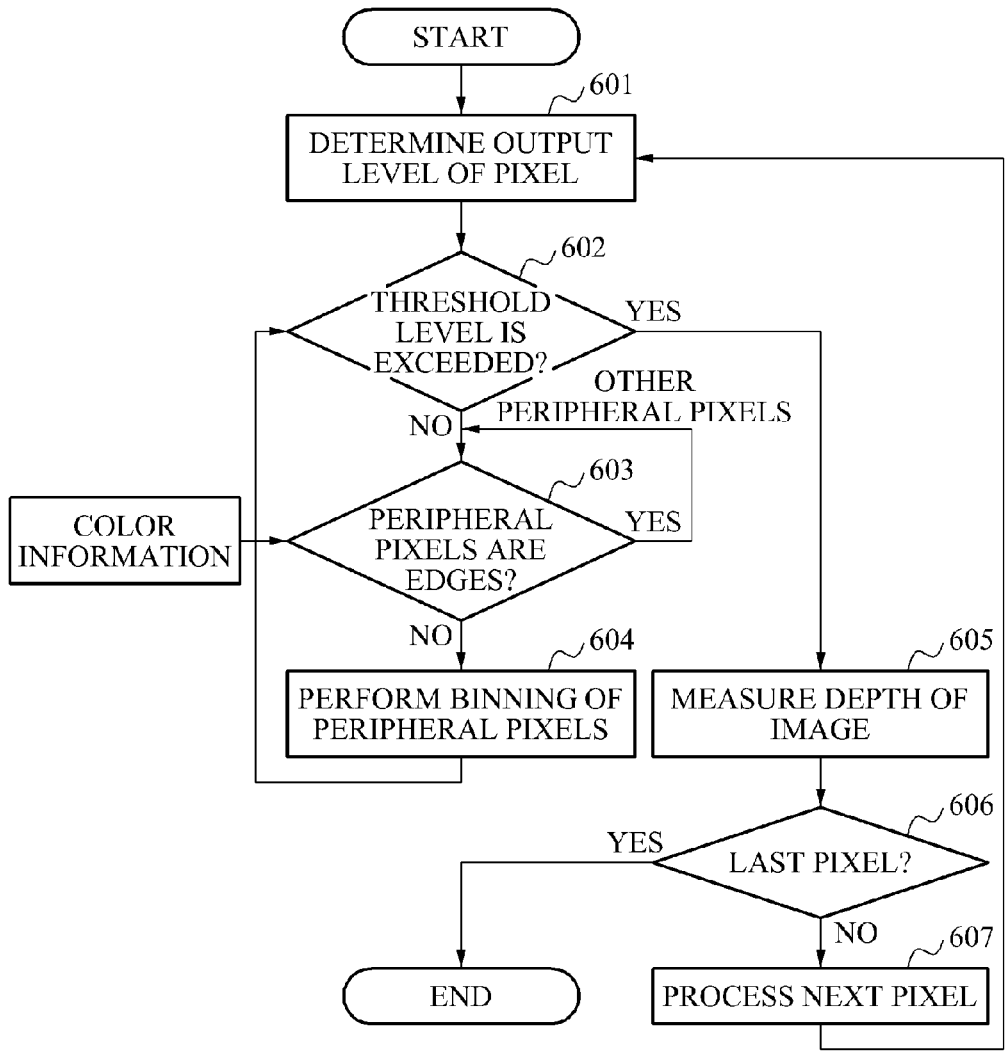
FIG. 6 illustrates a method of binning a pixel according to further other example embodiments.

FIG. 6 illustrates a method of binning a pixel according to further other example embodiments.

In operation 601, the pixel binning apparatus may determine an output level of a pixel constituting a sensor. Here, the pixel binning apparatus may determine output levels of all pixels of the sensor, or an output level of a current pixel from which a depth image is to be acquired. Hereinafter, a case where the pixel binning apparatus determines the output level of the current pixel for acquisition of the depth image will be described.

In operation 602, the pixel binning apparatus may determine whether the output level of the current pixel exceeds a threshold level. When the output level of the current pixel does not exceed the threshold level, the pixel binning apparatus may determine, using color information, whether peripheral pixels adjoining the current pixel correspond to edges in operation 603. When the peripheral pixels do not correspond to edges, the pixel binning apparatus may bin the current pixel and the peripheral pixels in operation 604. That is, the pixel binning apparatus may be able to prevent the edge blurring, by not performing binning between the peripheral pixels corresponding to the edges and the peripheral pixels not corresponding to the edges. Here, the peripheral pixels corresponding to the edges and the peripheral pixels not corresponding to the edges are considered to have different colors.

In operation 602, the pixel binning apparatus may determine whether a sum of the output level of the current pixel and output levels of the peripheral pixels exceeds the threshold level. Operations 602, 603, and 604 may be repeated until the output level exceeds the threshold level.

When the output level of the current pixel exceeds the threshold level, the pixel binning apparatus may measure depth of an image using the current pixel in operation 605. Next, in operation 606, the pixel binning apparatus may determine whether the current pixel is a last pixel of the pixels constituting the sensor. When the current pixel is the last pixel, the entire process is completed. When the current pixel is not the last pixel, a next pixel of the current pixel may be processed in operation 607. Here, the pixel binning apparatus may return to operation 601 to determine an output level of the next pixel.

Figure 7:
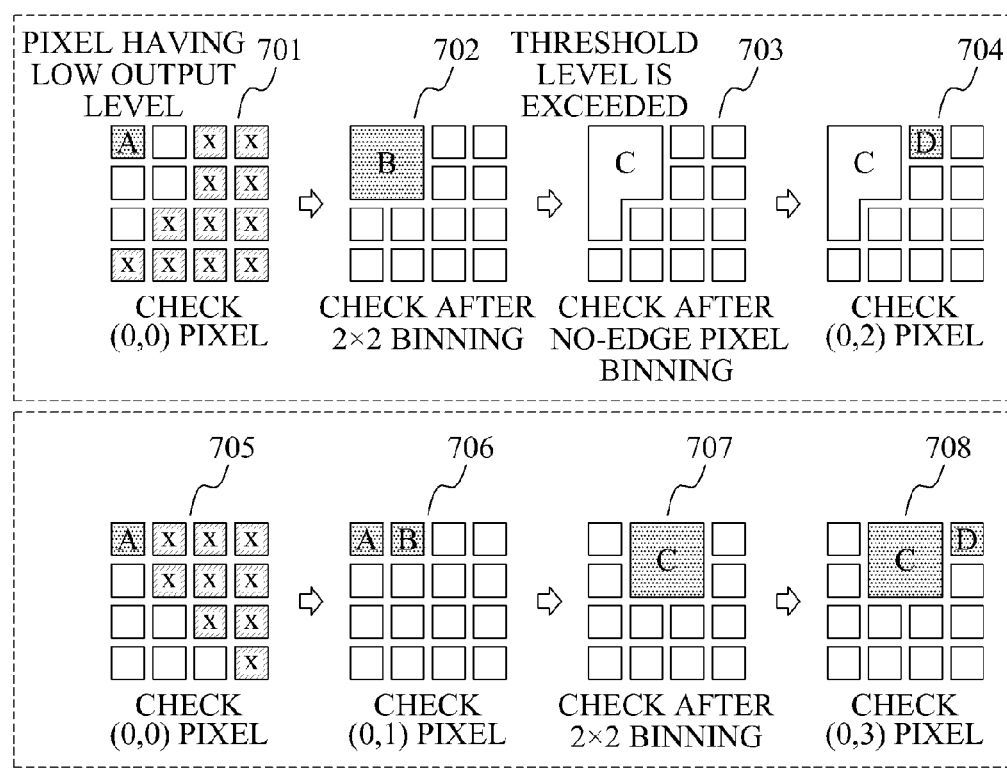
FIG. 7 illustrates a process of pixel binning according to the pixel binning method of FIG. 6.

FIG. 7 illustrates a process of pixel binning according to the pixel binning method of FIG. 6.

For example, in operation 701, the pixel binning apparatus may determine an output level of a current pixel A for extraction of the depth image. The current pixel A is located at (0, 0) in the sensor. Here, it is presumed that the output level of the current pixel A does not exceed the threshold level.

Therefore, in operation 702, the pixel binning apparatus may derive a current pixel B by binning peripheral pixels of the current pixel A into the current pixel A. Here, the current pixel B may be in a square form of 2×2. However, the current pixel B may be in a rectangular form. The pixel binning apparatus may determine whether an output level of the current pixel B exceeds the threshold level, subsequently determining whether to perform additional pixel binning.

When the output level of the current pixel B does not exceed the threshold level, the pixel binning apparatus may bin peripheral pixels of the current pixel B into the current pixel B in operation 703. However, since pixels marked with an X have colors different from the current pixel B in operation 701, the pixel binning apparatus may bin, into the current pixel B, remaining peripheral pixels other than peripheral pixels having different colors among peripheral pixels adjoining the current pixel B, thereby deriving a current pixel C.

Next, the pixel binning apparatus may determine whether an output level of the current pixel C exceeds the threshold level, accordingly determining whether to perform additional pixel binning corresponding to the current pixel C. Here, when the output level of the current pixel C exceeds the threshold level, the pixel binning apparatus may extract a depth image from a next pixel without performing additional pixel binning.

Next, in operation 704, the pixel binning apparatus may determine an output level of a current pixel D which is a next pixel of the current pixel C, and compare the output level with the threshold level, accordingly determining whether to perform additional pixel binning.

According to another example, in operation 705, the pixel binning apparatus may determine the output level of the current pixel A located at (0, 0). Here, when the output level of the current pixel A exceeds the threshold level, the pixel binning apparatus may extract a depth image of the current pixel B located at (0, 1) without binning peripheral pixels.

Accordingly, in operation 706, the pixel binning apparatus may determine the output level of the current pixel B. Here, it is presumed that the output level of the current pixel B does not exceed the threshold level.

In operation 707, the pixel binning apparatus may extract the current pixel in a 2×2 form by peripheral pixels of the current pixel B into the current pixel B. Here, since the current pixel B and the peripheral pixels of the current pixel have similar characteristics corresponding to a color indicated by X, edge blurring may be prevented from occurring even when the current pixel B and the peripheral pixels are not binned into each other. Next, the pixel binning apparatus may determine whether the output level of the current pixel C exceeds the threshold level. Here, it is presumed that the output level of the current pixel C exceeds the threshold level.

In operation 708, the pixel binning apparatus may determine the output level of the current pixel D which is the next pixel of the current pixel C. Next, the pixel binning apparatus may compare the output level of the current pixel D with the threshold level, accordingly determining whether to perform pixel binning corresponding to the current pixel D.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A pixel binning apparatus comprising:
    an output level determining unit to determine an output level of a current pixel for acquisition of a depth image, among a plurality of pixels constituting a sensor; and
    a pixel binning unit to, when the output level of the current pixel is less than a predetermined threshold, repeatedly perform binning of peripheral pixels of the plurality of pixels adjoining the current pixel into the current pixel to thereby provide binned pixels each having an output level, until a sum of the output levels of the binned pixels exceeds the predetermined threshold level,
    wherein when the sum exceeds the predetermined threshold level, the pixel binning apparatus measures depth of an image using the binned pixels.

2. The pixel binning apparatus of claim 1, wherein the output level determining unit determines the output level of the current pixel using intensity of a reflected light from an object.

3. The pixel binning apparatus of claim 2, wherein the intensity of the reflected light is determined based on at least one of reflectance of the object and a distance to the object.

4. The pixel binning apparatus of claim 1, wherein the pixel binning unit performs binning corresponding to the current pixel, considering an edge derived from color information.

5. The pixel binning apparatus of claim 4, wherein the pixel binning unit bins, into the current pixel, remaining peripheral pixels other than peripheral pixels corresponding to the edge, among peripheral pixels adjoining the current pixel unrelated to the edge.

6. The pixel binning apparatus of claim 4, wherein the pixel binning unit bins, into the current pixel, peripheral pixels related to the edge other than peripheral pixels unrelated to the edge, among peripheral pixels adjoining the current pixel related to the edge.

7. The pixel binning apparatus of claim 1, wherein when the sum exceeds the predetermined threshold level, the pixel binning apparatus extracts a depth image from a next pixel adjacent to the binned pixels.

8. A pixel binning method comprising:
    determining an output level of a current pixel, for acquisition of a depth image, among a plurality of pixels constituting a sensor;
    repeatedly performing, when the output level of the current pixel is less than a predetermined threshold, pixel binning of peripheral pixels of the plurality of pixels adjoining the current pixel into the current pixel to thereby provide binned pixels each having an output level, until a sum of the output levels of the binned pixels exceeds the predetermined threshold level; and
    when the sum exceeds the predetermined threshold level, measuring depth of an image using the binned pixels.

9. The pixel binning method of claim 8, wherein the determining of the output level comprises determining the output level of the current pixel using intensity of a reflected light from an object.

10. The pixel binning method of claim 9, wherein the intensity of the reflected light is determined based on at least one of reflectance of the object and a distance to the object.

11. The pixel binning method of claim 8, wherein the repeatedly performing of pixel binning comprises performing pixel binning corresponding to the current pixel considering an edge derived from color information.

12. The pixel binning method of claim 11, wherein the performing of pixel binning comprises binning, into the current pixel, remaining peripheral pixels other than peripheral pixels corresponding to the edge, among peripheral pixels adjoining the current pixel unrelated to the edge.

13. The pixel binning method of claim 11, wherein the performing of pixel binning comprises binning, into the current pixel, peripheral pixels related to the edge other than peripheral pixels unrelated to the edge, among peripheral pixels adjoining the current pixel related to the edge.

14. The pixel binning method of claim 8, wherein when the sum exceeds the predetermined threshold level, extracting a depth image from a next pixel adjacent to the binned pixels.

15. A non-transitory computer readable recording medium storing a program to cause a computer to implement the method of claim 8.

* * * * *